United States Patent Office.

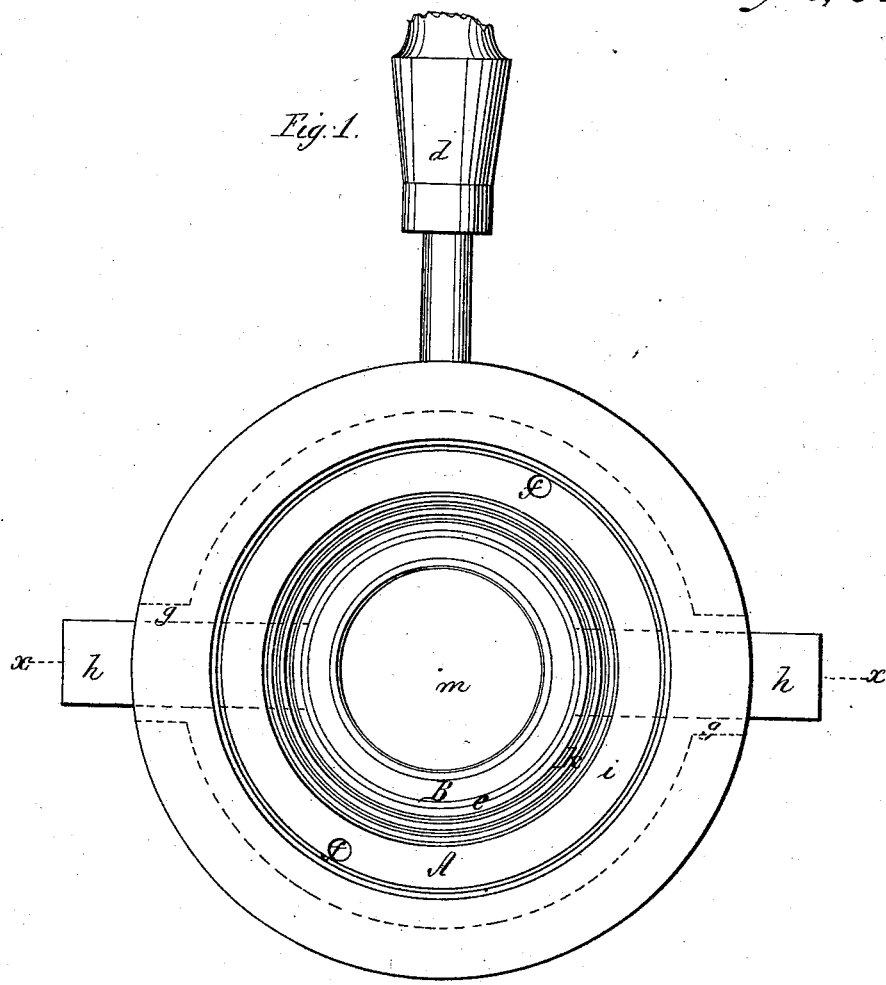

HOMER BROOKE, OF NEW YORK, N. Y.

Letters Patent No. 93,591, dated August 10, 1869.

---

IMPROVED GLASS-MOULD.

---

The Schedule referred to in these Letters Patent and making part of the same.

---

*To all whom it may concern:*

Be it known that I, HOMER BROOKE, of the city, county, and State of New York, have invented a new and useful Improvement in Glass-Moulds, of which the following is a full, clear, and exact description, reference being had to the accompanying drawing, forming part of this specification, and in which—

Figure 1 represents a plan of a glass-mould, constructed in accordance with my improvement;

Figure 2, a vertical section of the same, taken mainly as indicated by the line $x\,x$ in fig. 1; and Figure 3 a transverse section of a glass jar-lid as made by my improved mould, constructed according to the modification shown in the drawing.

Similar letters of reference indicate corresponding parts.

In moulding various articles of glass, in which a depression or depressions are to be made within a surrounding rim or outer portion, as, for instance, glass lids or covers to preserve and other jars formed with an annular cavity in them, to receive within it the mouth or upper edge of the jar, there is great liability of such outer rim or surrounding portion "shrending," chrisling, or cracking, from the too rapid cooling of such portion, and absence of suitable provision for contraction of the glass on the inner edge or surface of the same.

One of the objects of my invention is to remove this liability.

It also insures the cavity or cavities being of the required or uniform depth; and where, owing to the structure of the article, there is any tendency to warp, provides, or may provide, a suitable support for the prevention of the same, besides securing other advantages.

To attain these ends, in part or in whole, my invention consists in such a sectional construction of the mould, and fit of the one section within the other, as that the glass, while in the mould, may have its recessed portion, hereinbefore referred to, relieved, in advance of the outer rim or surrounding portion, from contact with the heated mould, by motion given to the one section of the latter relatively to the other section thereof, and provision also be formed, where required, for support of the article in the mould, when so relieved, both externally and internally relatively to such recess or recesses in the article; and, likewise, so that any surplus glass put into the mould is prevented from being forced into the said recess or recesses to diminish their depth; and, in certain articles, the outer central surface exposed to a cooling action, while the surrounding portion is kept warm in the mould.

Furthermore, the invention consists in a combination, with such a divided construction of the mould, in which the one section, or part of it, is circumscribed by or made to fit through the other section, of outlets or passages for the escape of dirt and oil, or extraneous matter, passing down between the joint of the sections, and, unless thus allowed to escape, interfering with the stroke of the movable or relieving-section of the mould relatively to the other section, and which would necessarily produce irregularity in the work.

The mould represented in the accompanying drawing is of a form suitable for making glass lids or covers to preserve and other jars, substantially of the description represented in fig. 3, and which, being well known, may here be briefly described as consisting of an under central plug-portion, $a$, which enters the mouth of the jar, an annular groove or cavity $b$, to receive within it the mouth-edge of the jar, and an outer or surrounding-rim, $c$, to bear down on a gasket-packing, arranged to surround the neck of the jar at a slight distance below its mouth.

While a mould of this description has been selected to illustrate my invention, the form of the mould may, of course, be changed according to the article required to be made; but the manufacture of such a glass lid or cover serves to clearly explain the several advantages which are or may be attained by my improvement, hence the following description will be restricted to such a mould.

The general operation is as usual, that is to say, a suitable quantity of glass, in a plastic state, to form a lid is put on to the heated mould, and the latter slid, by its handle, $d$, over a bed or table under a plunger, which, coming down, presses the glass into the mould that, in connection with the pressing-surface of the plunger, gives to the lid its required form.

Usually the lid is made bottom-side uppermost, the plunger being constructed with an annular rim, that sinks the annular groove $b$ in the lid.

This gives no room for escape of surplus glass from under the plunger, so that the depth of the groove $b$ is apt to vary or be shallower than will admit of the lid coming down fairly upon the gasket, applied to the jar to secure a close fit.

Such defect is avoided by my invention, the lid being pressed top side uppermost in the mould, that is made up of a main section, A, and inner concentric annular section, B, arranged to have vertical play, the one within or through the other, preferably the annular section B plays up and down through the top surface of the main section A, while the latter rests upon the table; but this, by a suitable construction, may be reversed to produce the same effect, that is, the annular section B made to lie upon the table of the press while the main section A is moved up or down.

The arrangement shown in the drawing shows the section B as being the moving one.

This inner section is of annular form, and is fitted to work freely up and down through an annular opening, $e$, in the upper portion of the outer or main section A, that may be made of an upper and lower part, secured together by screws $ff$, and that may have vertical slots or side openings $gg$ in it, to allow of arms $hh$, of or from the inner or annular section, projecting through the outer or main section, to effect lift or drop of the annular section.

The depressions and surfaces $i$, $k$, and $m$ of the main section A of the mould serve, in conjunction with the plunger of the press, to give the general configuration to the lid, while the annular section B, when raised, forms the annular groove $b$ in the lid.

Immediately, however, after pressure has been applied, to thus mould the lid, the annular section B is lowered, as represented by red lines in fig. 2.

This removes all obstructions to the contraction of the rim $c$ of the lid, establishes a rest for the plug-portion $a$ and rim $c$, to prevent warping, and allows of the rim $c$ gradually cooling or setting in the heated mould, while, by the retiring of the plunger, the outer and upper central portion of the lid, which has worked into it any surplus glass that may have been put into the mould, is unbound and exposed to the cooling influence of the air.

In this way, all shrending of the rim $c$ is avoided, the groove $b$ made of uniform depth, and the several other advantages hereinbefore specified obtained.

The annular section B may be raised and lowered, at the proper periods, by causing the arms $hh$ to ride over and leave inclined projections on the press-bed as the mould is run under and away from the plunger, or it may be raised and lowered by other means, either having a straight or spiral action.

In case of the main section A being made the rising and falling one, the action will be reversed, that is, it will have to rise instead of falling when it is required to leave the groove $b$ free from contact with the mould, while the rim $c$ and plug-portion $a$ remain in contact with it.

Such action of the sectional mould is in no way analogous to a mere rising and falling support to the rim of the lid that does not leave the rim proper embedded in the mould, and, when raised, leaves the plug-portion of the lid unsupported, and which only serves as a handle or means for lifting the lid out of the mould.

As, in the working of such a sectional mould, dirt will unavoidably pass down at the joint established by the annular opening $e$ in the main section, and it may be frequently necessary to apply oil to such part, the accumulation of such oil and dirt beneath the rising and falling section would, in course of time, impede its working and shorten its stroke, which would produce irregularity in the work.

To provide against this, I provide outlets or passages within or through the stationary section for the escape of such matter, as, for instance, by forming a channel, $n$, around the base of the central portion of the main section, and clearance apertures or openings $rr$ leading therefrom through the grooved plate or portion of said section.

What is here claimed, and desired to be secured by Letters Patent, is—

1. A glass-mould, for forming articles having one or more depressions in them, made in sections, as described, and so that the one section, which has a rising and falling motion, will leave the depressions free from contact with the mould, while the outer surrounding portion to such cavity or cavities remains embedded in, and continues supported on the mould, substantially as and for the purpose or purposes herein set forth.

2. The combination, with sectional mould, constructed to operate substantially as described, of a clearance channel, or passage or passages, arranged in relation to the joint established for play of the one mould-section through the other, to provide for the escape of dirt and oil, essentially as specified.

3. The sectional mould A B, constructed substantially as shown and described.

HOMER BROOKE.

Witnesses:
JAMES J. CAMPBELL,
J. W. COOMBS.